United States Patent [19]

Bartholet et al.

[11] Patent Number: 4,646,296
[45] Date of Patent: Feb. 24, 1987

[54] DISTRIBUTED TELEPHONE SYSTEM

[75] Inventors: Chauncey I. Bartholet, Scarsdale; Joseph Hardy, Bedford, both of N.Y.

[73] Assignee: Bard Technologies, Bedford, N.Y.

[21] Appl. No.: 628,744

[22] Filed: Jul. 9, 1984

[51] Int. Cl.⁴ .............................................. H04J 1/10
[52] U.S. Cl. ...................................... 370/124; 370/76
[58] Field of Search .................. 370/124, 76, 110.1, 370/85, 89, 95; 179/2 DP, 18 AD; 340/825.5

[56] References Cited

U.S. PATENT DOCUMENTS

| | | | |
|---|---|---|---|
| 3,573,379 | 4/1971 | Schmitz et al. | 370/124 |
| 4,020,289 | 4/1977 | Anderson | 370/76 |
| 4,107,471 | 8/1978 | Reed | 370/76 |
| 4,262,171 | 4/1981 | Schneider et al. | 370/124 |
| 4,339,816 | 7/1982 | Reed | 370/76 |
| 4,373,183 | 2/1983 | Means et al. | 370/85 |
| 4,513,413 | 4/1985 | Gorman et al. | 370/76 |
| 4,521,881 | 6/1985 | Stapleford et al. | 370/124 |

OTHER PUBLICATIONS

"Putting Broadband into Perspective", Dec. 1984, pp. 67–68.
"Performance Issues in Local-area Networks" by W. Bux, vol. 23, No. 4, 1984, pp. 351–374.

*Primary Examiner*—Douglas W. Olms
*Attorney, Agent, or Firm*—Nixon & Vanderhye

[57] ABSTRACT

A communication system is provided for the interconnection of telephones and other instruments capable of communicating via the voice spectrum, the system providing a single transmission line such as a coaxial cable by which full duplex communication is provided between any pair of telephones. Each instrument is coupled to the transmission line by a control unit which includes computer operated transceiver equipment for paging other ones of the control units to initiate a telephonic communication. Each control unit is provided with an identification number and circuitry for recognizing the identification number contained within a paging signal so as to initiate a response. In a separate spectral portion of the transmission line, there are provided sets of analog communication channels each of which has upper and lower spectral portions to provide two-way communication in opposite directions between a pair of telephones engaged in communication. A transmitter and a receiver in each of the control units is provided for the communication of analog signals of both voice and data via the voice channel, each control unit including circuitry for tuning the transmitter and the receiver to the selected channel in accordance with digital data transmitted via the transmission line and specifying a selected one of the voice channels.

20 Claims, 7 Drawing Figures

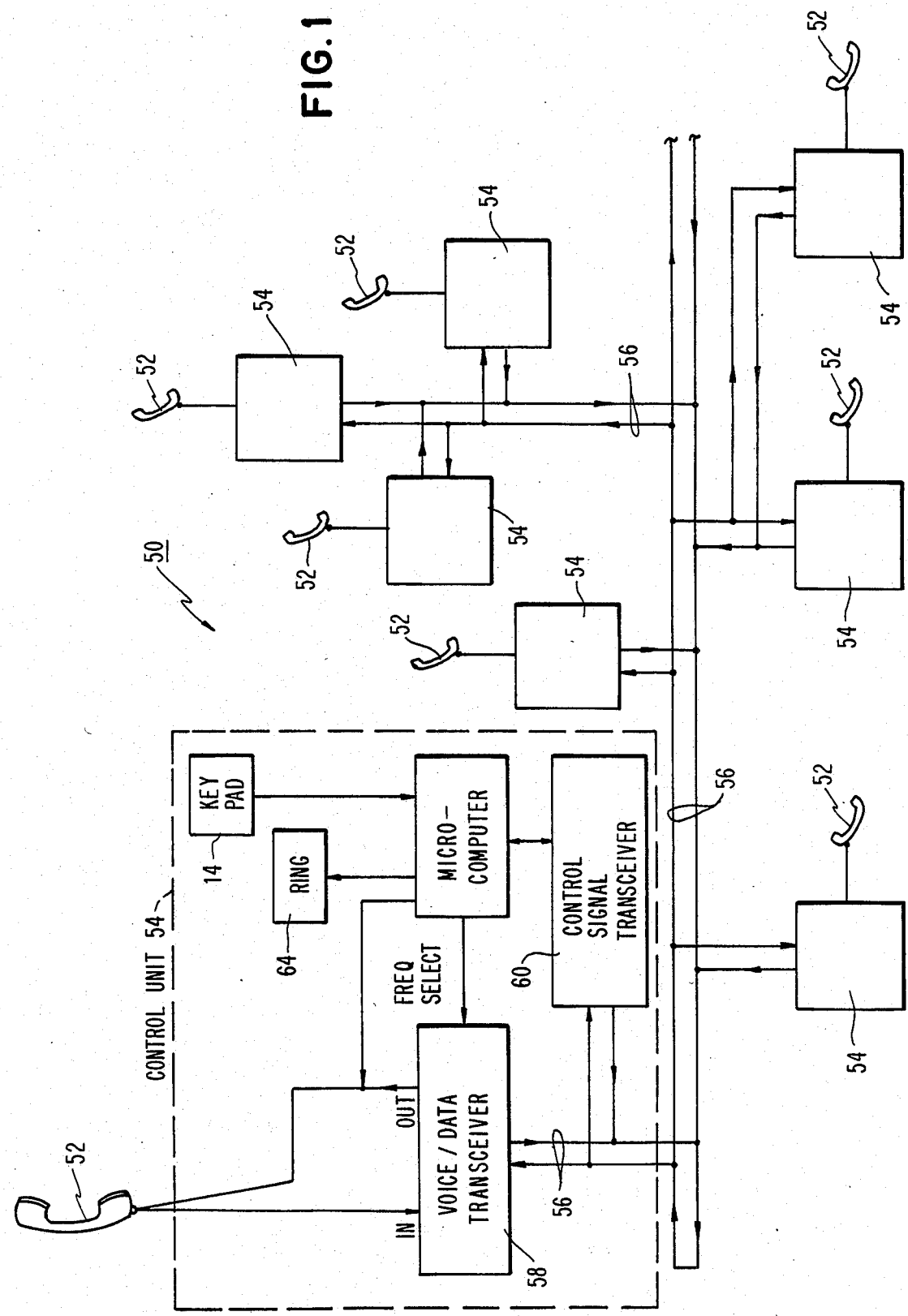

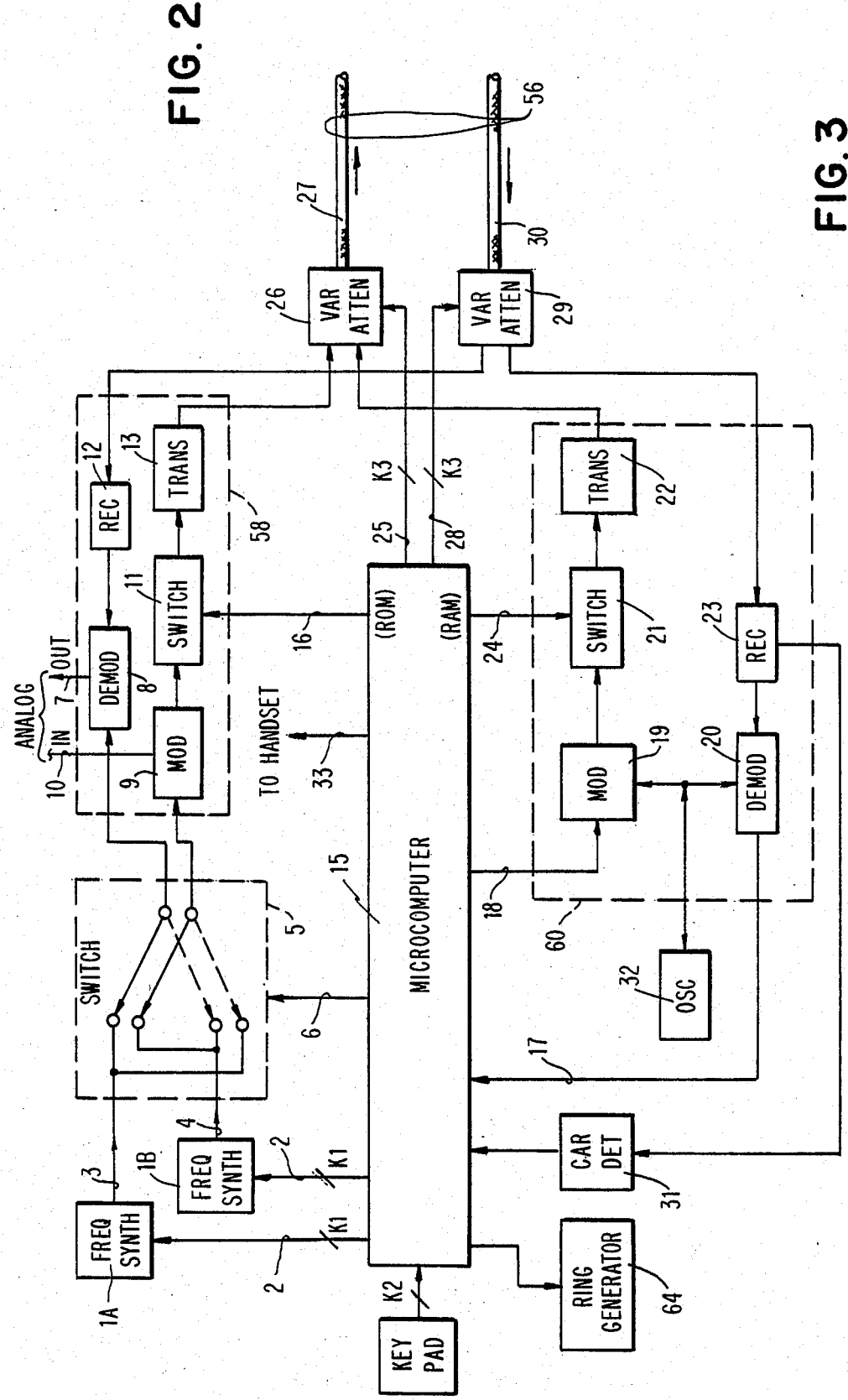

DISTRIBUTED TELEPHONE SYSTEM

BACKGROUND OF THE INVENTION

This invention relates to telephone systems for transmission of both voice and data and, more particularly, to a system wherein all telephone sites are interconnected by a common coaxial transmission line with switching and routing functions being performed by on-site control units which couple the telephones to the transmission line.

Presently, there are two basic types of telephone and data switching systems in use. The first type of system, which is the most widely used, incorporates central office switching. Such systems include the private branch exchange (PBX) which operates in the manner of a miniature central office. The second type of system is the local area network (LAN) which employs digitized voice and data transmission over a common cable.

The central office or PBX type of system is characterized by the use of individual wires, such as a pair of wires or group of such pairs, to connect each telephone instument to a central switch. The overall configuration of such a system has the form of a star with the central office switching at the middle and the individual telephone instruments being connected to the central office by their respective telephone lines. The central switch and its control equipment performs all of the necessary management functions for providing the voice and data communications, thereby to allow individual telephone instruments to communicate with any other one of the telephone instruments. In recent years, the telephone management functions, whether in a central office or in an on-site PBX, have been expanded to include a variety of sophisticated capabilities such as call forwarding, call camp-on, conference calling, call back, autodial, and least-cost routing as well as providing statistical information for efficient management of the system.

The major disadvantages of the central switching approach arise from the dependence on the star wiring configuration, this resulting in an excessively large size and complexity to the central switch for the interconnection of thousands of telephone instruments. The star wiring configuration is not economical for small telephone systems. Furthermore, the star wiring configuration requires very large amounts of wire because the telephone line must extend from the location of each telephone instrument all the way to the central switch. Changes in the instrument may require new wiring as is the case wherein a call director instrument is substituted for a single line instrument necessitating the installation of multiple telephone lines. If the original single line instrument were re-installed, the surplus wire would be useless.

Other disadvantages arise with the star wiring configuration in that dependence on the central switch causes system fragility because a switch failure shuts down the entire system. If more advanced functions are to be accommodated with the central switch, the switching equipment must contain a complex and powerful computer and very sophisticated software to manage the thousands of instruments simultaneously, as well as to switch voice traffic among them. Such complexity further increases the fragility of the central office switch.

The LAN incorporates a number of interconnected on-site PBX's via a common cable capable of high speed data transmission. Each PBX is substantially smaller than the usual central office switch. The resulting system has the form of clusters of star-wired PBX units connected to each other by a common cable network which may be configured in either the shape of a ring or a star configuration. While such a system may employ somewhat less wire than a central office system accommodating the same number of instruments, the system suffers, essentially, from the same disadvantages as the aforementioned central office system. Although each PBX unit is smaller and therefore less complex than the central office system, the PBX unit must be provided with the necessary functions to permit the unit to coordinate and connect with other ones of the PBX units.

Another approach to the design of a LAN has been the use of a common cable to physically connect individual instruments or data terminals. Significantly, these systems have all relied on digital signal processing implementations to allow the multiplexing of both voice and data signals in high speed transmission bands of the common cable. Such digital signal processing has limited the practical capacity of the cable to a few hundred simultaneous conversations, in contrast with a desired capacity of carrying tens of thousands of conversations. The poor utilization of the digital approach results in such impracticality that the LAN's have been used primarily to carry high speed data traffic instead of voice communication.

Attempts have been made to enlarge the signal-carrying capacity of the cable by frequency division wherein plural transmission bands are provided to carry digital signals with the bands being spaced apart along the frequency spectrum. Such frequency division adds complexity to the coordinating and the connecting of communications among the plural transmission bands, thereby rendering such a system to be impractical for voice transmission. Additionally, broadband telephone transmission devices have heretofore required manual adjustment of their transmitting power levels to insure that all signals received on the common cable are of substantially the same strength. While the deployment of large numbers of such broadband devices would be desirable in the use of a telephone system, the manual adjustment of power levels would render such deployment impractical.

SUMMARY OF THE INVENTION

The foregoing disadvantages are overcome and other benefits are provided by a telephone system which, in accordance with the invention, is constructed with a transmission line that connects with the site of each telephone in the system. Preferably, a coaxial cable is employed as the transmission line. Connection of each telephone to the coaxial cable is accomplished with the aid of an intelligent control unit which controls all switching and routing of communication between the telephone and other telephones of the system.

Both conversation and control signals are communicated via the coaxial cable. Voice and data signals in analog format are transmitted between telephones via any one of a set of relatively narrow bandwidth channels within the relatively broad frequency passband of the cable. A single channel of relatively wide bandwidth is reserved for the transmission of control signals in digital format.

The system comprises many control units with one control unit being provided at each site. The control units are identical to each other. Each control unit can be employed with a telephone handset or other source of telephonic signal such as a facsimile transceiver for the the transmission and reception of picture information. Each control unit includes a microcomputer, two transmitters and two receivers. One of the transmitters and one of the receivers are used for the transmission and reception of radio-frequency (RF) narrow band telephone signals for voice and data communications. The second transmitter and the second receiver are used for wide band RF transmission and reception of control signals generated by the control units for the switching and the routing of the telephone signals on the narrow bandwidth channels.

The microcomputer is programmed to perform the various operations necessary to effect the various functions to be provided by the system, this programming including central-office channel selection and switching functions presently employed both in central offices and private branch exchanges. If desired, the system can utilize an existing two way coaxial cable system currently in use for the transmission of cable television or other communications. In particular, the microcomputer incorporates memory for storing the use and availability of the narrow band channels, and for selecting one of the channels in accordance with a preestablished protocol in response to a request to initiate a telephonic communication. The microcomputer also generates a data control word including an identification number of the telephone site which is to be called. The control word is received by all control units of the system, and the control unit at the desired site responds by way of a further control word identifying the channel to be utilized in the communication. In the event that the telephone at the desired site is in use (line is busy), or in the event that no person answers the phone, other control words are transmitted by way of response to indicate the condition of the telephone. It is noted that all control units receive all messages transmitted along the control signal channel, including channel usage, such information being most useful in the performance of more elaborate functions such as conference calling.

BRIEF DESCRIPTION OF THE DRAWING

The aforementioned aspects and other features of the invention are explained in the following description taken in connection with the accompanying drawing wherein:

FIG. 1 shows the configuration of the system of the invention including a set of telephone instruments coupled by a corresponding set of control units to a common transmission line;

FIG. 2 is a block diagram showing components of a control unit of FIG. 1;

FIG. 3 shows a data control word format for signals communicated between control units;

DETAILED DESCRIPTION

Figure 4:
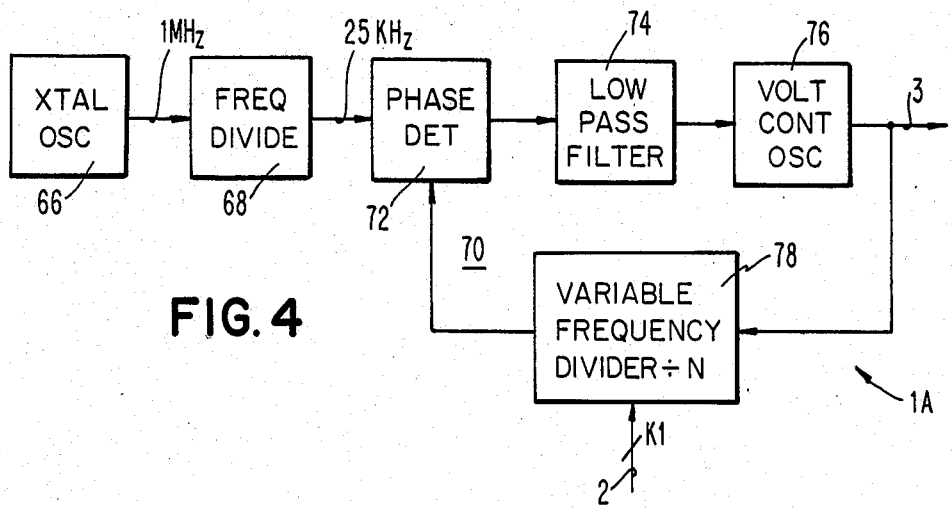
FIG. 4 shows a block diagram of a frequency synthesizer employed within the control units of FIG. 2.

With reference to FIG. 1, there is shown a telephone system 50 constructed in accordance with the invention. The system 50 includes a set of telephone handsets 52, each of which is connected by a control unit 54 to a common transmission line 56. Each control unit 54 includes a transceiver/58 for the reception and transmission of voice/data signals and a transceiver 60 for the transmission and reception of control signals.

Signals of a handset 52 are converted to RF signals by the transceiver 58, the RF signals then propagating along the transmission line 56 to all of the control units 54. In one of the control units 54, the transceiver 58 is tuned to the frequency of the RF signal and, in that control unit 54, the transceiver 58 receives the RF signal and translates the signal back to audio frequency for reception by the handset 52 connected to that control unit 54. The transmission line 56 has a bandwidth which is sufficiently wide to carry many channels, each of which is at a separate portion of the frequency spectrum, and each of which can carry a voice conversation between a pair of the control units 54. In addition, the bandwidth of the transmission line 56 is sufficiently wide to incorporate a broad band channel having sufficient bandwidth for the propagation of digital control signals between the transceivers 60 and the respective control units 54. The transmission line 56 may be a coaxial cable or waveguide for the case of RF signal or, may be fabricated as a light pipe for the propagation of optical signals in which case the transceivers 58 and 60 would have suitable well-known devices for the conversion of electrical signals to optical signals. In the preferred embodiment of the invention, the transmission line 56 comprises a coaxial cable such as that utilized for the two way transmission of cable television programs.

In the use of the system 50, control signals are transmitted along the line 56 to initiate a telephonic communication between a calling party, or sender of the message, to another telephone or target which is to receive the message. It is noted that while handsets 52 are shown by way of example, is to be understood that communication can be maintained between other devices such as facsmile in which signals are generated within the audio spectrum for transmission over the usual telephone channel. As will be described in further detail, hereinafter, the control signals transmitted between the transceivers 60 are used for tuning the transceivers 58 to a common channel so that persons located at the sender site and the target side can converse with each other. In order to initiate a conversation, each control unit 54 is provided with an identification number. Thus, when a sender wishes to call a target, the control signal transmitted by the sender transceiver 60 includes the identification number of the control unit 54 associated with the target.

Referring also to FIG. 2, there is provided a more detailed description of components of the control unit 54. Each control unit 54 comprises two frequency synthesizers 1 which are further identified by the legends A and B such that the synthesizer 1A generates a carrier frequency in the upper half of a voice/data communication channel of the line 56 for the transmission of a message in one direction between the parties; the synthesizer 1B generates a carrier frequency at the lower half of the selected communication channel for transmission of the message in the reverse direction between the two parties. Thereby, by the use of the two carriers within the same communication channel, full duplex communication is attained. Typically, a voice/data spectrum has a bandwidth in the range of 3000 hertz (Hz) to 3500 Hz. Two of the foregoing voice spectra are incorporated within a single communication channel to provide for the full duplex capability, the center frequencies of the two spectra being spaced apart in a range of 7 kilohertz (kHz) to 15 kHz with a nominal value of 10 kHz being utiized to inhibit crosstalk between the two spectra of the communication channel. As will be shown with reference to FIG. 4, each of the synthesizers 1 incorporates digital circuitry which is responsive to a multiple-bit digital signal provided by a set of K1 frequency-data input lines 2.

Each control unit 54 further comprises a selector switch 5 connected by lines 3 and 4 to the synthesizers 1A-1B respectively. The switch 5 is operated in response to a signal on a control line 6. The switch 5 provides the capability of selecting either the upper or lower carrier frequency to be utilized for sending or receiving a message in accordance with a protocol to be described hereinafter.

The voice/data transceiver 58 in each control unit 54 comprises a demodulator 8 and a modulator 9 which connect with the earpiece and mouthpiece, respectively, of handset 52.

Also included within the transceiver 58 are a switch 11, a receiver 12 and a transmitter 13. RF signals coupled to the transceiver 58 by the transmission line 56 are received by the receiver 12, the RF signals then being demodulated by the demodulator 8 and then outputed along line 7 to be heard by the handset 52. Signals spoken into the handset 52 are inputed by a line 10 to the modulator 9 which then modulates the telephone signal onto a carrier. The modulated carrier signal produced by the modulater 9 is coupled by the switch 11 to the transmitter 13 for transmission by the transmission line 56 to a distant control unit 54 for the switch contacts of the switch 5 as portrayed in FIG. 2, the carrier frequency produced by the synthesizer 1A is employed by the demodulator 8 in the demodulation of incoming RF signals while the carrier frequency produced by the snythesizer 1B is employed by the modulator 9 and the generation of the outgoing RF signal. Typically, the modulation utilized by the demodulator 8 and the modulator 9 is phase modulation, it being understood that other well-known forms of modulation maybe utilized if desired.

The control unit 54 further comprises a keyboard or keypad 14 and microcomputer 15, the keypad 14 being used by the sender party to enter the identification number into the computer 15 for the target party which is to be called. The computer 15 is coupled by the foregoing lines 2 and 6 respectively to the synthesizers 1 and the switch 5, and is also coupled by a control line 16 to the switch 11 for initiating and terminating the connection of analog signals to the imput terminal of the transmitter 13. The transceiver 60 for the transmission and reception of control signals is coupled to the microcomputer 15 by lines 17 and 18, the line 17 coupling incoming control data to the microcomputer 15, while control data is outputed from the microcomputer via line 18 to the transceiver 60.

The transceiver 60 comprises a modulator 19, a demodulator 20, a switch 21, a transmitter 22 and a receiver 23. The components of the transceiver 60 operate as do the corresponding components of the transceiver 58, except that the components of the transceiver 60 operate at a single carrier frequency. The modulator 19 and the demodulator 20 operate with FSK (frequency shift keying) or another well-known form of modulation for the transmission of digital data along the transmission line 56. A control line 24 from the microcomputer 15 operates the switch 21 to initiate and terminate the transmission of digital signals by the transmitter 22. Control data signals initiated by the microcomputer 15 are modulated onto a carrier by the modulator 19 and transmitted by the switch 21 and the transmitter 22 to the other control units 54 of the system 50. Control data signals emanating from other ones of the control units 54 of the system 50 are received at the receiver 23 and demodulated by the demodulator 20 to be applied to the microcomputer 15.

Signals coupled between the transmission line 56 and each of the transceivers 58 and 60 are connected via variable attenuators 26 and 29, the attenuators 26 and 29 being of a well-known form for attenuating RF signals in response to multiple-bit digital signals applied via lines 25 and 28 from the microcomputer 15 to the attenuators 26 and 29, respectively. Connection between the attenuator 26 and the transmission line 56 is made by coaxial cable 27, and connection between the transmission line 56 and the attenuator 29 is made by coaxial cable 30. The attenuator 26 is used for adjusting the intensity of signals transmitted by the transceivers 58 and 60 to a suitable amplitude for reception by other ones of the control units 54. The attenuator 29 is utilized for adjusting the intensity of signals received from other ones of the control units 54 to a suitable signal intensity for reception by the transceivers 58 and 60.

In view of the fact that all of the control units 54 transmit over the same transmission channel, with respect to the transmission of the control data signals, each microcomputer computer 15 monitors the transmission line 56 for the presence of control data signals of other ones of the control units 54 prior to the generation and transmission of a control data signal. The monitoring of the transmission line 56 is accomplished by means of a detector 31 of the carrier of such other transmissions, the carrier detector 31 being coupled to the receiver 23 for the detection of the carrier of such other control data signal transmissions. Also included within each control unit 54 is an oscillator 32 for providing the carrier to the modulator 19 and the demodulator 20 of the transceiver 60.

The control data digital words transmitted between transceivers 60 of the various control units 54 has the form presented in FIG. 3. Such control word includes the line number identifying the sender, the line number identifying the target, a transaction code such as an indication that the party wishes to initiate a communication, and when required a channel number identifying the voice/data channel which is to be employed in communicating between two of the control units 54.

In FIG. 2, a ring signal generator 64 provides a ring signal under command of the microcomputer 15. In addition, the microcomputer 15 can be employed for the introduction of audible signals to the handset 52 via the line 33, such as when the microcomputer 15 receives a data word via the transceiver 60 indicating that the telephone at the desired control unit 54 is in use.

FIG. 4 shows details in the construction of the frequency synthesizer 1A. The synthesizer 1B has the same form as the synthesizer 1A and, accordingly, only the synthesizer 1A will be described to facilitate the description of the invention. The synthesizer 1A comrpises a crystal oscillator 66, a frequency divider 68, and a phase locked loop 70. The loop 70 comprises a phase detector 72, a low pass filter 74, a voltage controlled oscillator 76, and a variable frequency divider 78. By way of example in the construction of the synthesizer 1A, the oscillator 66 provides an output signal at a frequency of one megahertz which is applied to the divider 68. Typically, the divider 64 comprises a counter, as is well known, which counts cycles of the oscillator output signal. By way of example, the divider 68 has a division ratio of forty resulting in an output signal of 25 kHz which is applied to the phase detector 72 of the loop 70. The oscillator 76 applies an output signal to the divider 78 which operates in a manner analagous to that of the divider 68 to provide an output signal at a frequency of 25 kHz to the reference input terminal of the phase detector 72. The detector 72 provides a loop error signal proportional the difference in phase between the input and reference signals, the error signal being filtered by the filter 74 in a well known manner to provide a control voltage to the oscillator 76. Thereby, the frequency of the oscillator 76 is locked to the frequency at the output of the divider 68 by a fixed ratio, N. The divider 78 comprises well known digital counting circuitry wherein the ratio, N, is established in accordance with digital words on the set of lines 2, these digital words being provided, as noted hereinabove, by the microcomputer 15. The output frequency on lines 3 and 4 can be raised in increments of the 25 kHz frequency appearing at the input to the phase detector 72.

Assuming, by way of example, that the butput frequency on line 3 has a nominal value of 10 megahertz (MHz), then the aforementioned nominal value of 10 kHz between the transmission and reception portions of a voice channel can be accomplished by setting the synthesizer 1B to a frequency which differs from that of the synthesizer 1A by 10 kilohertz (kHz). Thereby, the carrier signals on lines 3 and 4 of FIG. 1 differ in frequency by a nominal value of 10 kHz. As the carrier frequencies are scaled upwards and downwards by variations in the value of N, the frequency difference between the carriers in lines 3 and 4 remains constant. This provides a desired frequency spacing between the transmitted and received portions of a voice communication channel over a useful set of channels. The digital words on lines 2 select the desired channel and also set the carriers for the transmit and receive portions of the voice channels. Digitally controlled frequency synthesizers, such as the synthesizer 1, are commercial ly available, such as that provided by Radio Shack in the citizen band radio model #TRC-451 or that provided by Heathkit in the "ham" radio model #HW-5400.

In operation, the microcomputer 15 includes read-only memory (ROM) and random access memory (RAM) with conventional input/output circuitry necessary to exchange information with other components of the control unit 54. The ROM contains the programming logic which allows the control unit 54 to interact with the other control units 54. The RAM provides facility for storing information, such as identification of the sender, unique to the control unit 54.

Upon installation of the system 50, each control unit 54 is provided with a unique "line" number, or identification number, which is entered into the microcomputer 15 via the keypad 14, to be stored in the RAM of the microcomputer 15. The keypad 14 may be of the standard form currently in use on pushbutton telephones. The line number is known to the users of the system 50 as the "telephone" number of the unit to be called as in any common telephone system. To facilitate an example in the use of the system 50, three of the control units 54 have been further identified by the letters X, Y and Z, these three units having line identifications as line 210, line 320, and line 430, respectively.

The placement of a call between unit X and unit Z, line numbers 210, and 430, respectively, would take place as follows. The control data receiver 23 in each of the units 54 receives, over the control data channel, any words transmitted by other ones of the control units 54. When a user at unit X wishes to connect unit X to unit Z, the user at X enters the number "430" into his microcomputer 15 via the keypad 14. The microcomputer 15 then checks the detector 31 for the presence of a carrier on the control data channel.

When no carrier is detected, the microcomputer 15 activates the switch 21 to transmit a control data word, having the format disclosed in FIG. 3, via the modulator 19 and the transmitter 22; thereafter, the microcomputer 15 turns off the switch 21 to terminate any further transmission. All of the units 54 receive the transmission from the sender via the transmission line 56.

In accordance with a feature of the invention, each of the units 54 maintains, in the computer memory RAM, a table of the busy/free status of all voice communication channels of the system 50. The microcomputer 15 in each unit 54 is also programmed to select, from the data received via the receiver 23, the information needed to maintain the status of other ones of the units 54. When the microcomputer 15 of unit Z receives the control data word transmitted by unit X, the microcomputer 15 of unit Z can than process the "call request". The microcomputer 15 of unit Z then selects a currently free channel from the channel status table and transmits along the transmission line 56 a data control word containing the sender's line numer (430 for unit Z), the target line number (210 for unit X), the transaction code for "accepting call", and the channel number to be used for the call.

Upon receiving this control data word, the microcomputers 15 in all of the control units 54 designate the selected channel as being busy. Also, the microcomputer 15 in unit X sets the frequency-data input lines 2 for the frequency synthesizers 1A–1B to the selected channel.

In accordance with a further feature of the invention, a protocol is established for each pair of units 54 communicating with each other wherein each unit 54 of the pair of control units 54 sets its selector switch 5 for transmission on the upper half of the voice/data channel if its "telephone line" number is higher than that of the other unit of the pair of control units 54, and to receive on the upper half of the voice/data channel if the line number of the control unit 54 is lower than that of the line number of the other unit of the pair of control units 54. In the foregoing example, unit Z has a higher numming ber than unit X. Accordingly, unit Z will transmit on the upper portion of the selected communication channel to unit X which is tuned to receive on the upper portion of the communication channel. Unit X will transmit on the lower portion of the communication channel to unit Z which will receive on the lower portion of the communication channel. This provides for the full duplex transmission/reception between the units X and Z.

As the two control units 54, namely the units X and Z, communicate with each other via the voice/data channel by use of the transceiver 58, the two units can communicate simultaneously via the control data channel by the transceivers 60. This capability of control data word exchange between autonomous control units 54 even while full duplex conversations, voice or data, are taking place under control of programming in the microcomputers 15 allows the implementation of advanced PBX functions, and also permits each control unit 54 to maintain system status tables such as those required for multiple-line telephones as well as maintaining the status of each communication channel.

With respect to the control of power levels by use of the attenuators 26 and 29, it is noted that a new output power setting can be transmitted by a data control word utilizing the transceivers 60. A requested increase or decrease in transmitted power can be communicated by use of the appropriate transaction code in the format of FIG. 3. Thereby, power of a remote control unit 54 can be increased or decreased if necessary to improve communication with another control unit 54.

Figure 5:
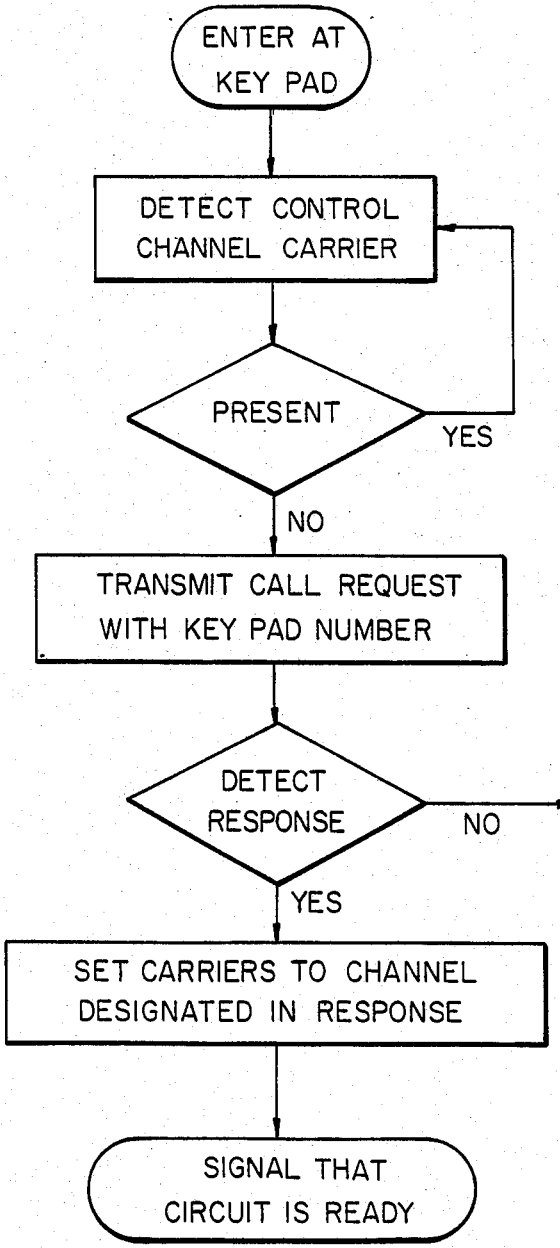
FIGS. 5 and 6 are flow charts showing the operation of a microcomputer in the control unit of FIG. 2.

In FIG. 5, the flow chart describes the operation of the microcomputer 15 in the control unit 54 of the sender party requesting a communication. The telephone number is entered at the keypad to alert the microcomputer 15 that a telephone call to a remote instrument is desired. Thereupon the microcomputer 15 samples the output signal of the detector 31 to determine whether a carrier is present on the control data channel. The microcomputer 15 continues to monitor the control data channel until it is free of the presence of a carrier from some other control unit 54. Thereupon the microcomputer 15 initiates a control word with the format of FIG. 3 to transmit a call request to all of the control units 54. The control unit 54 having the designated telephone number, the target party, then transmits a response to the sender. In the event that the microcomputer 15 does not receive a response, then the sending party is alerted of a failure to communicate, whereupon the sending party could again dial the telephone number. In the event that a response is received, such response contains the identification of the channel to be used for the communication and, accordingly, the microcomputer 15 commands the frequency synthesizers to set the carriers for the modulator and demodulator of the transceiver 58 to the appropriate channel. Then, the sending party can communicate by speaking into the handset 52.

Figure 6:
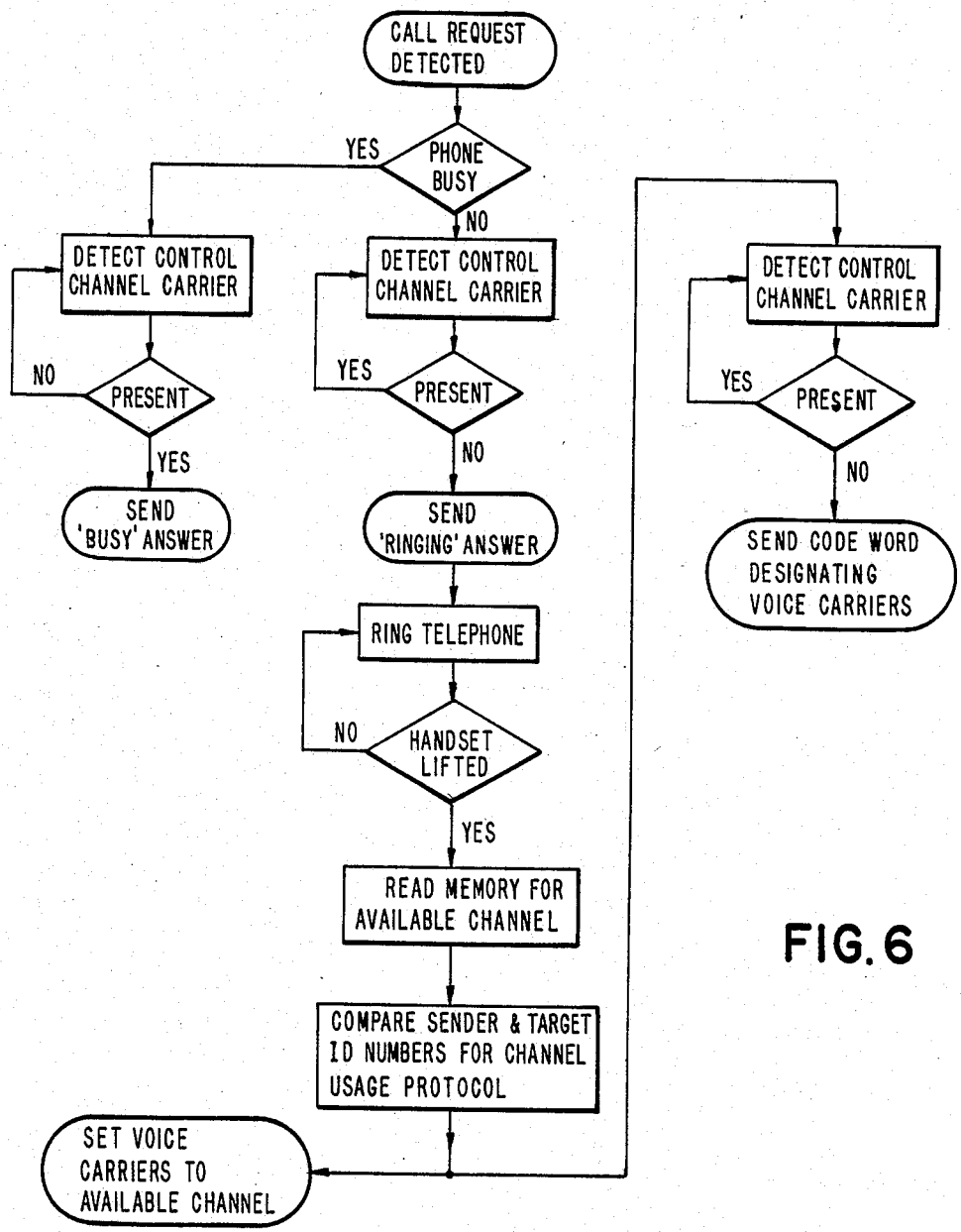

The flow chart of FIG. 6 describes the operation of the microcomputer 15 of the target party. An incoming control word having a transaction code indicating that a telephone communication is desired, and also having a target line number is processed by the microcomputer 15 to determine whether the target line number is identical to that of the control unit 54. If the number is identical, then the control unit 54 is alerted by the microcomputer 15 to the fact that it is the target party with whom a telephone call has been requested and, accordingly, the microcomputer 15 verifies if this unit is busy and if so sends a "busy" answer. If idle this unit's microcomputer 15 sends an answer indicating that this unit is "ringing" and then activates the generator 64 to ring. Such answers, in the form of control words, being transmitted only after a monotoring of the transmission line 56 determines that no other control units 54 are transmitting along the control data channel. In the event that the handset is lifted, then the target microcomputer 15 reads its memory, namely the RAM, to determine which voice/data channels are available and to select one such channel for the telephonic communication. The microcomputer 15 commands the appropriate frequencies from the synthesizers 1A-1B for the selected channel, and also transmits a control word to the sender party designating the selected communication channel. It is noted that the notification of the sending part of the desired channel is accomplished only after a checking of the transmission line 56 to determine whether any carrier is present from a communication of another control unit 54. The process of waiting for a free time slot on the control data channel insures that control information can be transmitted among the various control units 54 without any interference among the signals of the various control units 54.

In view of the foregoing description, it is apparent that the system of the invention presents a new approach to telephone switching and transmission. The inclusion within each control unit of a computer with memory and with a capacity for monitoring the status of the various communication channels provides intelligence to the control unit. The connection of the control units to a common coaxial cable introduces a wiring configuration such as that utilized in conventional two-way cable television systems. Each control unit has sufficient intelligence and switching capability to connect itself to any other control unit to establish two-way communication. This is accomplished without any telephone central switching system and, accordingly, there is no such central switch in the system of the invention. Thereby, inefficencies associated in the operation of a star wiring configuration with a central switch are not present with the system of the invention and, in addition, the complexity and fragility of the central switch are eliminated. The voice transmissions are performed in an analog fashion rather than in the digital fashion which would require a much broader bandwidth and a time division multiplexing of the signals of the various conversations being carried by the telephone system. Accordingly, the system of the invention can carry many more conversations simultaneously, the number of simultaneous conversations being increased by an order of magnitude. A single digital transmission channel is employed for the coordination of the individual control units. Thus, the system of the invention can perform all of the usual switching and transmission functions, as well as more advanced switching and transmission functions through the expedient of simply programming the microcomputer. The units can also adjust the power level of transmitted signals as required, and can also maintain data and statistics on the use of the various communication channels.

Figure 7:
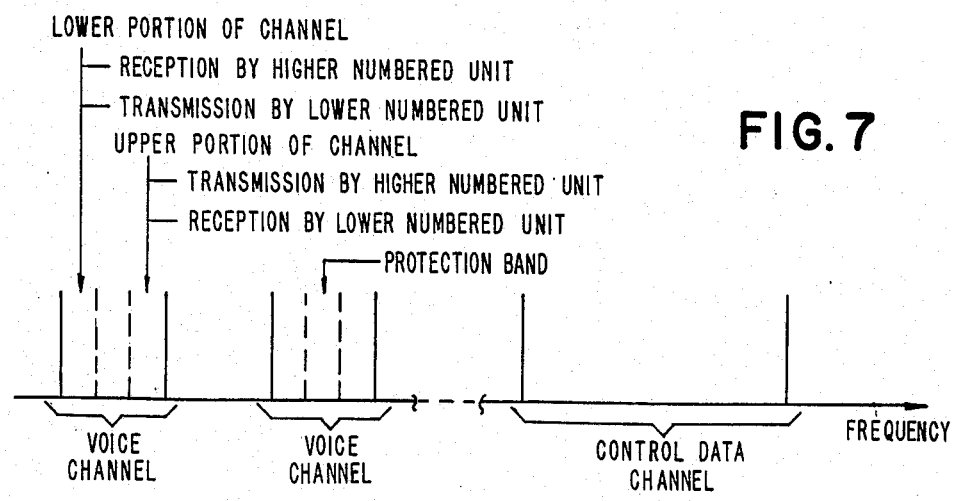
FIG. 7 is a graph showing spectrum utilization.

With reference to FIG. 7, there is shown a graph portraying the utilization of the frequency spectrum for the various voice/data channels and the control data channel. FIG. 7 shows two of the many voice channels and the control data channel. The bandwidth of a voice channel is substantially less than that of the control data channel. The channels carrying the voice and/or data are divided into an upper portion and a lower portion, with the two portions being spaced apart in the frequency domain by a protection band to inhibit crosstalk between signals propagating along the transmission line 56 (FIG. 1) in the upper portion and in the lower portion of the voice channel. The protocol for assignment of the foregoing portions of the voice channel for transmission and reception by one of the control units 54 (FIG. 1) is also shown in FIG. 7. In the upper portion of a voice channel, there is transmission of an analog signal by the control having the higher identification number, with the analog signal of the upper portion being received by the control unit having the lower identification number. Correspondingly, in the lower portion of the channel, there is transmission of an analog signal by the control unit having the lower identification number, with the analog signal of the lower portion being received by the control unit having the higher identification number. Thereby, FIG. 7 demonstrates the inventive feature of full duplex communication.

With respect to the installation of the system 50, a telephone and its control unit can be installed in a home, an office, and other locations where telephones are employed. The coaxial cable which serves as the transmission line may be supported on telephone poles or placed under ground. Each telephone with its control unit may be regarded as a station for the transmission and reception of information. The identification number identifies the station, and the interchanging of the handset, or the adding of additional stations does not alter the identification number. Also, the interposition of facsimile device for the transmission of pictorial data in lieu of the handset for the transmission of voice would not alter the identification number since it is the number solely of the control unit. All transmissions of a control unit, whether on a voice channel or a control channel propagate to all of the other control units in the system. Therefore, the initiation of a telephone call is in the nature of a paging of the desired party, which paging is "heard" by all parties. In the case of the control channel, only the control units having the called identification number respond. In the case of the voice channel, only the control unit which is tuned to the voice channel participates in the full duplex communication. The selection of the upper and lower portions of each voice channel to be designated for transmitted and received messages is accomplished in accordance with the protocol based on the relative magnitudes of the identification numbers of the sender and target parties.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A telephone system for communicating voice and/or data among a set of stations comprising:
    transmission-line means intercoupling said stations, said transmission line means having sufficient band width for simultaneous transmission of a plurality of channels spaced apart in the frequency spectrum, a first of said channels being used for paging whereby a first of said stations initiates a communication with a second of said stations, the remainder of said plurality of channels being voice channels reserved for the communication of voice and/or data between groups of said stations;
    each of said stations comprising a voice receiver and a voice transmitter for the reception and transmission of voice and/or data signals by a voice channel, each of said stations comprising tuning means for tuning the voice receiver and the voice transmitter of the station to an available voice channel;
    each of said stations further comprising memory means for storing the usage and availability of the plurality of voice channels, thereby to permit said tuning means to tune the voice transmitter and the voice receiver to an available channel;
    each of said stations further comprising a paging transceiver coupled to said paging channel for transmission and reception of control data by said paging channel, the microcomputer in each of said stations including means responsive to a station address received in a paging signal for generating a control signal on said paging channel indicating a busy/free status of a telephone at a station, said paging transceiver continuously monitoring control data transmitted on said paging channel and updating said channel availability and usage stored in said memory means in response to said monitored control data; and wherein
    a control data word transmitted by a station via the paging channel in placing or accepting a telephone call includes the identity of a voice channel to be utilized for a full duplex communication between two of said stations.

2. A telephone system according to claim 1, wherein said transmission-line means comprises a coaxial cable.

3. A system according to claim 1, wherein said computer is a microcomputer, and wherein each station further comprises means for attenuating signals transmitted and received by said station, said attenuating means being responsive to a control signal from said microcomputer.

4. A system according to claim 3, wherein a voice channel is divided into an upper frequency portion and a lower frequency portion for the transmission of signals in opposite directions simultaneously, each of said stations including a computer coupled to said memory means for implementing a protocol for assignment of transmission and reception functions to the upper and lower portions of a voice channel, said station address being in the form of an identification number, said assignment of the upper and lower portions of a voice channel being based on the relative magnitudes of the identification numbers of the station initiating a telephone call and the station receiving a telephone call.

5. A communication system comprising:
    a transmission line having a transmission spectrum encompassing a plurality of spectral bands defining a set of voice channels suitable for conmunication of analog voice and data signals, said transmission spectrum including a further separate band for communication of digital control signals;
    a set of telephonic instruments;
    a set of control units coupled between said transmission line and respective ones of said instruments;
    first means in each of said control units for communicating analog signals via said voice channel between individual ones of said telephonic instruments;
    second means in each of said control units for communicating digital control signals via said further band between individual ones of said control units, wherein said second communicating means includes a transmitter and a receiver and means coupled to said receiver for detecting the presence of a signal of another of said control units on said further band, said computing means restraining a transmission by said transmitter until said further band is free of signals of another of said control units;
    computing means in each of said control units responsive to said digital control signals for selecting one of said voice channels; and
    tuning means operated by said computing means for tuning said first communicating means to a selected voice channel.

6. A communication system according to claim 5 wherein said first communicating means includes a transmitter and a receiver providing full duplex communication via a voice channel.

7. A system according to claim 6 wherein each control unit has an identification number, and wherein said computing means directs said transmitting means to transmit a digital control signal incorporating identification numbers of a sending control unit which initiates a communication and a target control unit which accepts a communication when no other digital control signals are present on said further band;
 there being an upper spectral portion and a lower spectral portion in each of said voice channels;
 said tuning means in said sending control unit and in said target control unit tuning the transmitter and the receiver of respective ones of said units to the upper and the lower spectral portions of the voice channel in accordance with a protocol of said computing means based on a relative magnitude of the identification numbers of the sending control unit and the target control unit.

8. A system according to claim 7 wherein, in accordance with said protocol, the transmitter of the first communication means in the control unit having the higher identification number transmits via said upper spectral portion of said voice channel, the receiver of the first communicating means of the control unit having the lower identification number receiving analog signals via said upper spectral portion of said voice channel.

9. A system according to claim 5 wherein said second communicating means includes means for modulating digital signals on to a carrier.

10. A system according to claim 9 wherein said first communicating means includes means for modulating analog signals on to a carrier, and wherein said detecting means detects the carrier of the digital modulated signals.

11. A system according to claim 10 wherein said telephonic instruments are telephones, and wherein each of said control units is provided with an identification number, each of said control units including keyboard means coupled to said computing means for entry of the identification number of the control unit associated with the telephone to be called.

12. A system according to claim 5 wherein said computing means includes:
 memory means for storing data, associated with said set of voice channels, indicating which of said voice channels are being used for communicating signals, and
 processing means operatively connected to said memory means, said transmitter and said receiver, for (1) selecting one of said voice channels in response to said stored data, (2) directing said transmitter to transmit digital signals indicating said selected voice channel to the other control units in said set over said further band, and (3) updating said stored data in response to digital control signals received by said receiver indicating voice channels selected by others of said control units.

13. A distributed telephone system comprising:
 transmission medium means for conveying voice and/or data signals over plural predetermined voice channels and for conveying control signals over a predetermined control channel; and
 plural communication units communicating with said medium means, each unit including:
 transceiver means for transmitting and receiving signals on a selected voice channel and for transmitting and receiving control signals on said control channel,
 carrier sensing means operatively connected to said transceiver means for inhibiting said transceiver means from transmitting on a channel carrying signals thereon,
 memory means for storing data associated with said plural voice channels, said stored data indicating which of said voice channels are being used for commnunicating signals, and
 a digital signal processor operatively connected to said memory means and said transceiver means and programmed so as to perform the following functions:
 (1) select one of said voice channels in response to said data stored in said memory means,
 (2) control said transceiver means to transmit signals indicating said selected voice channel on said control channel,
 (3) control said transceiver means to transmit and receive signals on said selected voice channel, and
 (4) update said information stored in said memory means in response to control signals, conveyed by said control channel and received by said transceiver means, indicating voice channels selected by others of said plural communication units.

14. A system as in claim 13 wherein:
 said transceiver means includes a control channel receiver and a control channel transmitter tuned to said control channel; and
 said carrier sensing means includes a carrier detector coupled to said control channel receiver for inhibiting said control channel transmitter from transmitting on said control channel whenever said control channel receiver receives a carrier present on said control channel.

15. A system as in claim 14 wherein said transceiver means further includes a voice channel transceiver operatively coupled to said processor and tunable to a selected voice channel, said control channel receiver and control channel transmitter capable of operating simultaneously with and independently of said voice channel transceiver.

16. A telephone unit having distributed processing capabilities comprising:
 transceiver means for transmitting and receiving signals on a selected one of plural predetermined voice channels and for transmitting and receiving control signals on a predetermined control channel;
 carrier sensing means operatively connected to said transceiver means for inhibiting said transceiver means from transmitting on a channel on which signals are present;
 memory means for storing data, associated with said plural voice channels, indicating which of said voice channels are being used for communicating signals; and
 a digital signal processor, operatively connected to said memory means and said transceiver means, programmed so as to perform the following functions:
 (1) select one of said voice channels in response to said data stored by said memory means,
 (2) control said transceiver seans to transmit signals indicating said selected voice channel on said control channel, (3) control said transceiver means to transmit and receive voice signals on said selected voice channel, and (4) update said information stored in said memory means in response to control signals, present on said control channel and received by said transceiver means, indicating voice channels selected by similar telephone units.

17. A system as in claim 16 wherein:

said transceiver means includes a control channel receiver and a control channel transmitter tuned to said control channel; and said carrier sensing means includes a carrier detector, coupled to said control channel receiver, for inhibiting said control channel transmitter from transmitting on said control channel whenever said control channel receiver receives a carrier present on said control channel.

18. A system as in claim 16 wherein said transceiver means further includes a voice channel transceiver operatively coupled to said processor and tunable to a selected voice channel, said control channel receiver and control channel transmitter capable of operating simultaneously with and independently of said voice channel transceiver.

19. A method for distributing processing throughout a telephone system of the type including plural telephone units connected to one another via plural voice channels and at least one control channel, said plural voice channels communicating voice signals between said plural telephone units, said control channel communicating control signals between said plural telephone units, each of said plural telephone units having a respective memory, said method comprising the steps, performed at each of said plural telephone units, of:

(1) selecting one of said plural voice channels in response to information stored in said telephone unit memory designating which of said voice channels are already being used for communicating voice signals;

(2) transmitting control signals on said control channel designating said voice channel selected by said selecting step;

(3) inhibiting said transmitting step (2) whenever signals are already present on said control channel;

(4) transmitting and receiving voice signals on said selected voice channel;

(5) continuously monitoring said control channel; and (6) updating the information stored in said telephone unit memory in response to control signals monitored by said monitoring step (5).

20. A method as in claim 19 wherein said monitoring step (5) and said transmitting and receiving step (4) are performed concurrently.

* * * * *